Oct. 14, 1969    W. H. GLASS ET AL    3,472,000
AIR DRYER AND PURGE CONTROL UNIT
Filed April 29, 1968
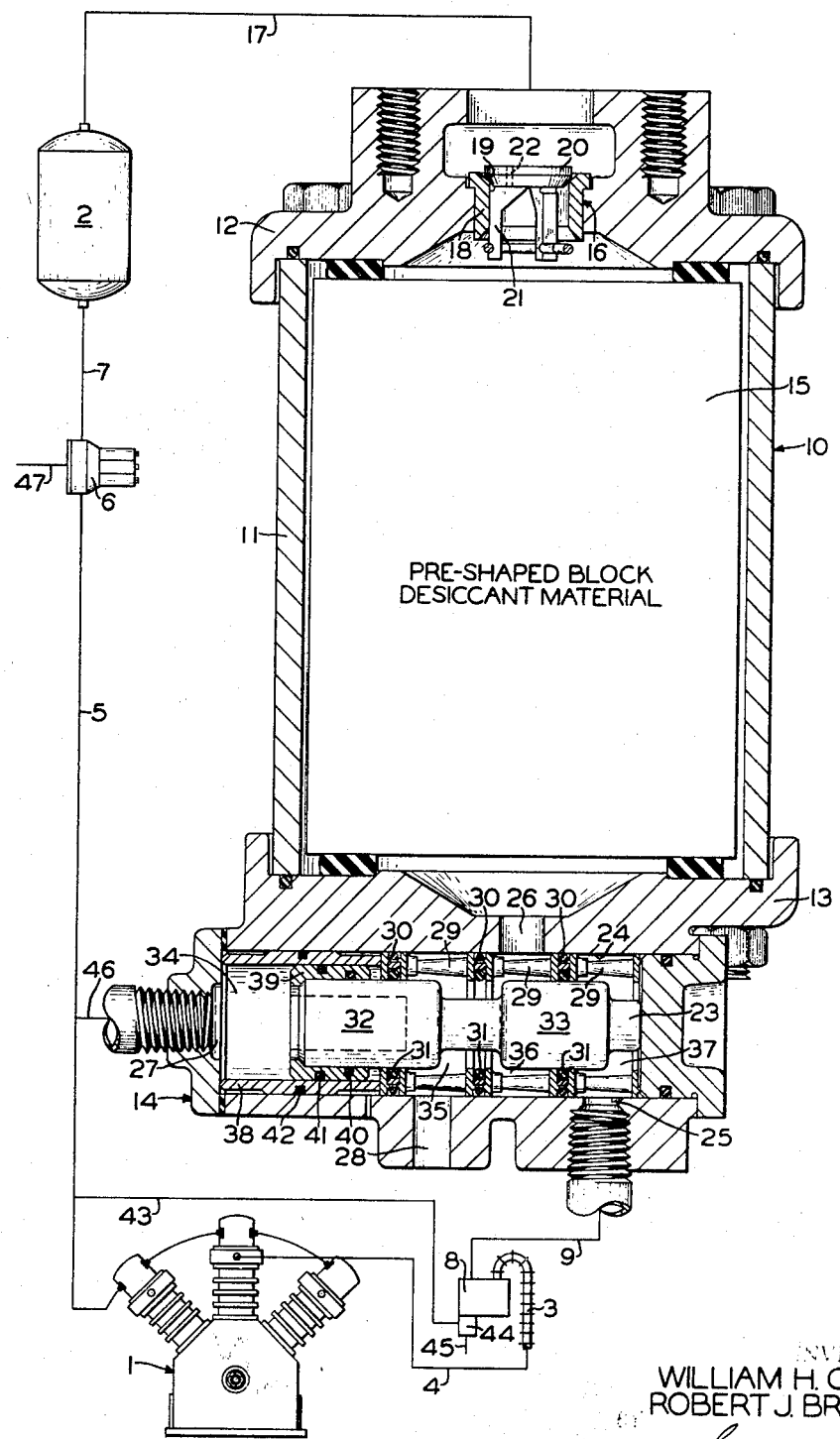

United States Patent Office 3,472,000
Patented Oct. 14, 1969

1

3,472,000
AIR DRYER AND PURGE CONTROL UNIT
William H. Glass and Robert J. Bridigum, Pittsburgh, Pa., assignors to Westinghouse Air Brake Company, Wilmerding, Pa., a corporation of Pennsylvania
Filed Apr. 29, 1968, Ser. No. 724,857
Int. Cl. B01d 53/30
U.S. Cl. 55—163                                    11 Claims

ABSTRACT OF THE DISCLOSURE

An air dryer and purge control unit interposable in a compressed air supply line for removing moisture from such compressed air. The unit comprises a casing in which a desiccant material is enclosed and at one end of which a control valve device is mounted, said control valve device being operable responsively to a control pressure impulse for cutting off flow of compressed air supply through the dryer and simultaneously opening an atmospheric communication whereby reverse flow of compressed air through the dryer to atmosphere is effected for purging the desiccant of moisture adsorbed thereby.

BACKGROUND OF THE INVENTION

Normally, a great deal of the moisture present in compressed air right after leaving the air compressor is removed by condensation as it passes through an aftercooler and accumulates in a sump whence it expelled to atmosphere through an automatically operable drain valve device. Some moisture, however, may still be present in the compressed air after having passed through the aftercooler. In order to remove such residual moisture, desiccant type dryers are interposed in the conduit between the aftercooler and the storage reservoir, the desiccant thus acting to dry the compressed air as it passes therethrough.

The use of a desiccant for removing moisture from compressed air passed therethrough, however, requires that such desiccant be purged periodically of the moisture adsorbed thereby, otherwise the purpose of the desiccant would be defeated if it were allowed to become saturated with moisture and remain in such condition.

There are many known arrangements in which desiccant-containing devices are interposed in the compressed air supply line for removing any residual moisture not removed by condensation during such time that the compressed air passes through the aftercooler. Some such schemes, particularly in a compressed air system in which the demand on the supply of compressed air is very great, use a multiple number of desiccant dryer devices in accordance with the volume of compressed air used by the system. In order to provide for efficient operation of the system, the operation for purging the dryer devices is so set up (as, for example, in a situation where two dryer devices are employed) as to effect alternate purging of the dryers by having one dryer purging while compressed air supply is flowing through the other, and vice versa.

In some compressed air systems, however, the demand on the supply of compressed air, due to usage, is not too great, and, therefore, a single dryer device in the system is normally sufficient for removing residual moisture not removed by condensation in the aftercooler and the drain valve associated with the sump.

SUMMARY OF THE INVENTION

The object of the present invention, therefore, is to provide an efficient, simply constructed, low-cost desiccant type dryer having a purge control valve device mounted thereon so as to comprise a compact unit readily installable in a compressed air system of the type wherein the usage of the compressed air is at a relatively low rate so as not to require frequent purging of the dryer.

Basically, the invention comprises a desiccant material enclosed in a casing which is normally intended to be interposed in a compressed air supply line between the aftercooler and the storage reservoir so that the compressed air leaving the aftercooler passes through the desiccant which acts to remove any residual moisture not removed by condensation in the aftercooler. A control valve device is mounted at the inlet end of the casing in which the desiccant is encased, while a check valve is mounted in the outlet end of said casing. The control valve device at the inlet comprises a differential pressure area piston-valve member having a smaller pressure area subjected constantly to the supply pressure and a larger pressure area subjected, at controlled intervals, to a control pressure for momentarily shifting the piston-valve member from a supply position, in which compressed air supply flows through the desiccant dryer device to the storage reservoir, to a purging position in which such supply flow is cut off and compressed air, at a controlled rate, back-flows from the storage reservoir through the desiccant dryer to atmosphere for purging the desiccant of any moisture adsorbed thereby during said supply flow. The check valve in the outlet end of the casing permits unrestricted flow of compressed air supply to the reservoir, but is provided with a choke for restricting reverse flow of compressed air from the reservoir to atmosphere during the purging period.

The single figure drawing, partly in section, represents a schematic arrangement of a typical compressed air system in which the invention is incorporated.

DESCRIPTION AND OPERATION

As schematically shown in the drawing, the compressed air system in which the invention is illustratively incorporated for the purpose of demonstrating the utility of the invention, is merely one of many systems in which the invention may be employed. The compressed air system as shown, therefore, comprises an air compressor 1 which may be driven by any suitable means (not shown) such as an electric motor, a gasoline engine, or a power take-off shaft, for example, for supplying compressed air to a main or storage reservoir 2 via an aftercooler 3 connected to said compressor by a pipe 4. If the compressor 1, for example, is driven by a gasoline engine (not shown), a fluid pressure responsive engine throttle control device and a compressor unloader (neither of which is shown) are connected by a pipe 5 to a standard type governor device 6 which, in turn, is connected by a pipe 7 to the main reservoir 2. The governor device 6, in well known manner, operates responsively to a preselected maximum pressure in the reservoir 2 to a cut-out position for causing the throttle control device to reduce the engine speed and, therefore, that of the compressor 1 to an idling speed, and at the same time cause the compressor unloader to unload the compressor by holding the compressor inlet valves (not shown) constantly open to atmosphere and thereby prevent any compression action. Upon reduction of air pressure in reservoir 2 to a preselected minimum pressure, the governor device 6 operates responsively to said preselected minimum pressure to a cut-in position to cause the throttle control device to restore the engine and the compressor 1 to normal running speed and to cause the unloader device to load the compressor by allowing normal operation of the compressor inlet valves. The pressure in reservoir 2 is thus maintained within a range between preselected high and low values corresponding to the preselected maximum and minimum pressures at which the governor device 6 is set to respond.

Compressed air from the aftercooler 3 flows through a sump associated with the aftercooler and in which moisture condensed out of the cooler compressed air is collected. From the sump 8 the compressed air flows through a pipe 9 to a dryer device 10 comprising a cylindrical casing section 11 sealingly closed at the outlet end by an upper cover portion 12, as viewed in the drawing, and at the inlet end by a lower cover portion 13, said lower cover portion serving to house a control valve device 14, the purpose of which will be explained hereinafter. The cylindrical casing section 11 contains an adsorbent desiccant material in the form of a preshaped block 15 through which the compressed air flows, whereby any residual moisture not condensed therefrom and collected in the sump 8, is adsorbed by the desiccant block as the compressed air passes therethrough. After passing through the desiccant block 15, the compressed air leaves the dryer device 10 via a check valve device 16 disposed in the upper cover portion 12 of said dryer device, thence through a pipe 17 to the reservoir 2.

The check valve device 16 comprises a valve seat member 18 in the form of a bushing fixed in the upper cover portion 12 and having formed thereon an annular valve seat 19 on which a valve member 20 is adapted to seat in a closed position in which back-flow from storage reservoir 2 through the dryer device 10 is prevented except at a restricted rate, as explained more fully hereinafter. A guide portion 21 formed integrally with the valve member 20 and slidably disposed in the valve seat member 18 permits unseating of said valve member upwardly from the valve seat 19, as viewed in the drawing, responsively to air pressure acting below the valve member and operation thereof to an open position determined by a stop ring in the lower end of the guide portion 21, in which compressed air supply may flow unrestrictedly from the dryer device 10 to the storage reservoir 2. A restricted passageway or purge choke 22 of preselected flow capacity is provided in the valve member 20 to permit restricted flow of compressed air from the reservoir side of the valve member to the other and, particularly, reverse flow from reservoir 2 through the dryer device 10, at a restricted rate determined by said purge choke, when said valve member is in its closed position, for a purpose to be hereinafter disclosed.

According to the invention, and as above noted, the lower cover portion 13 serves as the housing for the control valve device 14 which comprises a spool type piston-valve member 23 reciprocably operable within a bore 24 formed in said lower cover portion. The bore 24 is closed at each end by respective cap members sealingly and removably secured (by suitable means not shown) to the cover portion 13. The cover portion 13 is provided with a plurality of ports comprising an inlet or supply port 25, to which the compressed air supply pipe 9 is connected, an outlet or delivery port 26 opening to the cylindrical casing section 11 containing the desiccant block 15, a control pressure port 27, and an atmospheric port 28.

The volume within the bore 24 in the lower cover portion 13 is divided into a plurality of chambers by an appropriate number of axially aligned spacer elements 29 each one of which, at respective corresponding ends thereof, has an outer sealing ring 30 making sealing contact with the surface of bore 24 and an inner sealing ring 31 for making sealing and sliding contact with one of a pair of axially spaced land portions 32 and 33 formed on the piston-valve member 23. The plurality of chambers set off by the spacer elements 29 comprises, from left to right as shown in the drawing, a control pressure chamber 34 to which the control pressure port 27 opens, an atmospheric chamber 35 to which the atmospheric port 28 opens, a delivery chamber 36 to which the delivery port 26 opens, and a supply chamber 37 to which the supply port 25 opens.

The supply, delivery, and atmospheric ports 25, 26 and 28, respectively, and the spacer elements 29 with the sealing rings 30 and 31 are all positionally fixed relative to each other, but are so arranged relative to the lands 32 and 33 of the piston-valve member 23 that when said piston-valve member is in a supply position (to be hereinafter more fully described), supply port 25 is in communication with delivery port 26 via the supply chamber 37 and the delivery chamber 26, and communication between said delivery port and atmospheric port 28 is cut off. When the piston-valve member 23 is operated to a cut-off or purge position (in which it is shown in the drawing and as will be more fully described hereinafter), communication between supply port 25 and delivery port 26 is interrupted, and communication between said delivery port and atmospheric port 28 via delivery chamber 36 and atmospheric chamber 35 is established.

One end of the piston-valve member 23 comprises a pressure area of a certain dimension subjected to the pressure of compressed air supply flowing from pipe 9 and prevailing in supply chamber 37, while the opposite end of said piston-valve member comprises a pressure area of larger dimension than said certain dimension and subjectable to a control pressure directed to control chamber 34 in a manner to be hereinafter explained. A bushing 38, fixed in the end of bore 24 adjacent control chamber 34, has an inner diameter larger than the inner diameter of each of the sealing rings 31 in which the land 33 is slidably supported. A cup-like bushing 39, having an outer diameter such as to permit sliding movement thereof within the bushing 38, is fitted over the end of land 32 adjacent control chamber 34 and is movable therewith. Since the outer diameter of the cup-like bushing 39, as above noted, is substantially equivalent to the inner diameter of bushing 38 and is, therefore greater than the diameter of land 33, the effective pressure area subjectable to control pressure in control chamber 34 is greater than the effective pressure area subjected to supply pressure in supply chamber 37. Sealing rings 40 and 41 disposed in inner and outer grooves, respectively, formed in the cup-like bushing 39, and a sealing ring 42 disposed in an outer groove formed in bushing 38 prevent leakage of compressed air therepast from control chamber 34.

In operation, during such time that the air compressor 1 is in a loaded state, as above explained, compressed air therefrom flows via pipe 4, the aftercooler 3 (where most of the moisture therein is condensed and collected in the sump 8), pipe 9, and inlet port 25 of the control valve device 14 to supply chamber 37 therein. Assuming control chamber 34 to be void of compressed air pressure, the pressure of compressed air in supply chamber 37 acting on the adjacent pressure area of piston-valve member 23 is effective for causing said piston-valve member to be moved in a left-hand direction, as viewed in the drawing, to its supply position (above described) defined by abutment of the end of the cup-like bushing 39 against the end wall of lower cover portion 13. With the piston-valve member 23 in its supply position, compressed air supply may flow from supply chamber 37, past land 33 (which has cleared the sealing ring 31 at the right, as viewed in the drawing, and now makes sealing contact with the intermediate sealing ring 31), through delivery chamber 36, outlet port 26, the desiccant block 15 of the dryer device 10, past unseated check valve 16 and via pipe 17 to the storage reservoir 2. As the compressed air passes through the desiccant block 15 of the dryer device 10, any remaining moisture in the compressed air not removed by condensation after having passed through the aftercooler 3, is adsorbed by said desiccant block so that the air is completely dried before moving on to the storage reservoir 2.

When the pressure of compressed air in reservoir 2 attains the preselected maximum pressure, the governor device 6, in response to said maximum pressure, operates to its cut-out position to open a communication therethrough between pipes 5 and 7, so that compressed air from said reservoir is supplied to the compressor unloader device (not shown) to thereby provide a control or actuating pressure for causing the unloader device to unload the compressor.

At the same time, such control or actuating pressure is also supplied via a branch pipe 43 to an automatic drain valve device 44 associated with the sump 8. Since a detailed description of the drain valve device 44 is not deemed essential to an understanding of the invention, it is considered sufficient to merely state that said drain valve device may be one of any well known pressure responsive drain valve devices which operates responsively to the pressure supplied thereto via pipe 43 to effect opening of an atmospheric drain port 45 via which condensed moisture accumulated in the sump 8 is expelled. The drain valve device 44 also includes timing means (not shown) which automatically effects closing of the atmospheric drain port 45 after a predetermined time interval notwithstanding the length of time that the control or actuating pressure prevails in pipe 43.

Control or actuating pressure prevailing in pipe 5 is also supplied, via a branch pipe 46 and the control port 27, to the control chamber 34 of the control valve device 14. At the time that such control pressure is supplied to control chamber 34, that is, when the governor device 6 operates to simultaneously effect such supply of control pressure to the compressor unloader device (not shown) and to the automatic drain valve device 44, said control pressure is substantially equivalent to the pressure prevailing in supply chamber 37, because the pressure in said supply chamber at said time is equivalent to that in storage reservoir 2 which is at the preselected maximum pressure. Notwithstanding that the control pressure in control chamber 34 and supply pressure in supply chamber 37 are substantially equivalent, the piston-valve member 23 operates responsively to said control pressure to its said purge position, above defined, because the pressure area of the piston-valve member 23 subjected to the control pressure in control chamber 34 is larger than the pressure area subject to supply pressure in supply chamber 37, as was above noted.

With piston-valve member 23 in its purge position, in which it is shown in the drawing, communication between the inlet port 25 and the outlet port 26 is cut off, and said outlet port is in communication with atmospheric port 28 via atmospheric chamber 35. Compressed air may then flow reversely from the storage reservoir 2, thence via pipe 17, the choke 22 in the valve 20 of the check valve device 16 (now seated), through the desiccant block 15, outlet port 26, atmospheric chamber 35, and atmospheric port 28. As this reverse flow of compressed air occurs, the desiccant block 15 is purged of moisture adsorbed thereby during normal flow of compressed air from the aftercooler 3 to the storage reservoir 2.

Purging of the desiccant block 15 continues at a rate controlled by the choke 22 in the check valve device 16 as long as the governor device 6 remains in its cut-out position. When the compressed air in reservoir 2 has reduced to the preselected minimum pressure, the governor device 6, in response to said minimum pressure, operates to its cut-in position to close communication between pipes 7 and 5 and vent the latter to atmosphere via an atmospheric vent 47 provided in said governor device.

Of course, when pipe 5 is vented to atmosphere, the throttle control device (not shown) and the compressor unloader device (not shown) are relieved of actuating pressure so that the compressor 1 is restored to normal running speed and to a loaded condition for resuming normal output of compressed air.

At the same time, control chamber 34 of the control valve device 14 is also relieved of air pressure via port 27, pipe 46, pipe 5 and vent 47 in the governor device 6. With control chamber 34 relieved of air pressure and with resumption of compressed air supply from the compressor 1, the pressure of such compressed air, which is reestablished in the supply chamber 37, is effective for restoring the piston-valve member 23 to its supply position, above defined. With piston-valve member 23 in its supply position, supply of compressed air to the reservoir 2, as above described, is resumed and continues until such time that the pressure in said reservoir attains the preselected maximum pressure, whereupon, in the manner above described, purging of the desiccant block 15 is again initiated and continues until the pressure in said reservoir is reduced to the preselected minimum pressure.

The apparatus, as above described, thus functions in successive cycles, each cycle consisting of a supply period initiated by reduction of air pressure in the reservoir 2 to the preselected minimum pressure and in which compressed air is supplied to the reservoir 2, and a purging period initiated by attainment of the air pressure in said reservoir to the preselected maximum pressure and in which the desiccant block 15 is purged of moisture adsorbed thereby during the supply period.

Having now described the invention, what we claim as new and desire to secure by Letters Patent, is:

1. For interposition between air compressing means and a storage reservoir for the air compressed thereby, the combination of:
   (a) an air dryer, and
   (b) a control valve device on the upstream side of said dryer, said control valve device comprising a piston-valve member having opposing differential areas, the smaller one of which is subject at all times to the pressure of the compressed air supplied to the storage reservoir and the larger one of which is subjected selectively to the pressure of the compressed air in the reservoir, said piston-valve member being actuated to one position in which a supply communication is established via which compressed air flows in one direction through the said dryer to the reservoir when subject to the dominating force of the compressed air pressure acting on the smaller one of the pressure areas, and being actuated from the said one position to a second position responsively to the predominating force of compressed air acting on both pressure areas, in which second position the said supply communication is cut off and an exhaust communication is established via which compressed air flows reversely from the reservoir through the said dryer to atmosphere.

2. The combination, as set forth in claim 1, further characterized by means for selectively subjecting said larger one of the pressure areas to the pressure of compressed air in the reservoir.

3. The combination, as set forth in claim 1, further characterized by check valve means on the downstream side of said dryer, said check valve means comprising:
   (a) a check valve member past which compressed air may flow unrestrictedly in the said one direction through said dryer to the reservoir and checking reverse flow therepast from the reservoir, and
   (b) choke means via which compressed air may flow reversely from the reservoir through the dryer to atmosphere at a preselected restricted rate.

4. For interposition between air compressing means and a storage reservoir for the air compressed thereby, the combination of:
   (a) conduit means through which compressed air may flow in one direction from the compressing means to the storage reservoir,
   (b) an air dryer interposed in said conduit means and including a desiccant for removing moisture from the compressed air flowing through said air dryer to the storage reservoir,
   (c) a control valve device interposed in said conduit means on the upstream side of said air dryer and comprising a piston-valve member having opposing differential areas, the smaller one of which is subject at all times to the pressure of the compressed air supplied to the storage reservoir and the larger one of which is subjected selectively to the pressure of the compressed air in the reservoir, said piston-valve member being operable responsively to the dominating force of the compressed air pressure acting on the smaller of said pressure areas to a supply position in which a supply communication is established via which compressed air flows in said one direction, and being operable from said supply position responsively to the predominating force of compressed air pressure acting on both pressure areas to a purge position in which said supply communication is closed and a purge communication is open via which compressed air flows in a reverse direction from the reservoir through said dryer to atmosphere, and (d) a check valve device interposed in said conduit means on the downstream side of said air dryer and comprising:
  (i) a valve seat member,
  (ii) a valve member operable by flow of compressed air in said one direction to an unseated position relative to said valve seat member in which unseated position compressed air may flow unrestrictedly therepast in said one direction, and being operable by pressure of compressed air in the reservoir to a seated position relative to said valve seat member for checking reverse flow therepast from the reservoir, and
  (iii) choke means in one of said valve seat member and said valve member and via which compressed air may flow reversely from the reservoir through the dryer to atmosphere at a preselected restricted rate.

5. An air dryer and purge control unit for removing moisture from compressed air flowing through a supply line from a compressing means to a storage reservoir, which unit comprises:
(a) a casing interposable in the supply line,
(b) a desiccant disposed in said casing for adsorbing moisture from the compressed air flowing through said casing, and
(c) control valve means housed in one end of said casing and comprising:
  (i) a piston-valve member having respective pressure areas disposed at opposite ends thereof, one of said pressure areas being smaller than the other and being subject at all times to the pressure of compressed air in the supply line,
  (ii) said piston-valve member being normally operable, in response to prevailing force of the pressure acting on the smaller pressure area, to a supply position in which a first communication is provided for flow of compressed air in one direction through the desiccant to the storage reservoir, and
  (iii) being operable, in response to prevailing force of a control pressure selectively supplied to and acting on the larger of said pressure areas, to a purge position in which said first communication is cut off and a second communication is provided for flow of compressed air through the desiccant to atmosphere in a different direction opposite to said one direction for purging said desiccant of moisture adsorbed thereby during flow of compressed air in said one direction.

6. An air dryer and purge control unit, as defined in claim 5, wherein said one end of said casing comprises a removable cover member forming the housing for said control valve means.

7. An air dryer and purge control unit, as defined in claim 5, further characterized by a check valve device disposed in the end of said casing opposite said one end, said check valve device comprising a valve element effective, when seated, for checking flow of compressed air in said different direction through the dryer to atmosphere and past which, when unseated, compressed air may flow unrestrictedly in said one direction, and choke means via which compressed air may flow at a preselected restricted rate in said different direction when said valve element is seated.

8. An air dryer and purge control unit, as defined in claim 5, further characterized by:
(a) a cover member sealingly and removably secured at the end of said casing opposite said one end, and
(b) a check valve device housed in said cover member, said check valve device comprising:
  (i) a valve seat member fixed in said cover member and through which compressed air may flow,
  (ii) a valve element seatable on said valve seat member and providing, when in an unseated position, unrestricted flow of compressed air in said one direction, and
  (iii) means formed in one of said valve seat member and said valve element for providing restricted flow, when said valve element is in a seated position, of compressed air in said different direction.

9. An air dryer and purge control unit, as defined in claim 5, further characterized by a ported check valve device disposed in the end opposite said one end of said casing past which when unseated compressed air may flow unrestrictedly in said one direction and via which restricted flow occurs in the said different direction when seated.

10. In combination with a compressed air system including an air compressor, a storage reservoir, a supply line via which compressed air from the compressor is supplied to the storage reservoir, and a governor device operable to a cut-out position, in response to a certain maximum pressure in the reservoir, for unloading the compressor, and to a cut-in position, in response to a certain minimum pressure in the reservoir, for loading the compressor, an air dryer and purge control unit comprising:
(a) a casing interposed in the supply line between the compressor and the storage reservoir, said casing having an inlet end connected to the supply line on the compressor side and an outlet end connected to the supply line on the reservoir side,
(b) a desiccant disposed in said casing for adsorbing moisture from the compressed air flowing through said casing, and
(c) control valve means housed in said inlet end of said casing and comprising:
  (i) a differential pressure responsive piston-valve member having at one end a pressure area of a certain dimension subject to the pressure of compressed air in the supply line and having at the opposite end a pressure area of greater dimension than said certain dimension subjectable to the pressure of compressed air in the storage reservoir upon operation of said governor device to its said cut-out position,
  (ii) said piston-valve member being normally operable responsively to prevailing force of pressure acting on said pressure area at said one end to a supply position in which a supply communication is open and compressed air may flow therethrough and through the desiccant in one direction from the compressor to the storage reservoir, and,
  (iii) being operable responsively to prevailing force of pressure acting on said pressure area at said opposite end, during such time that said governor device is in its said cut-out position, to a purge position in which said supply communication is closed and a purge communication is open through which compressed air from the reservoir flows reversely through said desiccant to atmosphere for purging the desiccant of accumulated moisture therein.

11. The combination, as defined in claim 10, further characterized by:
(a) a removable cover member disposed at the outlet end of said casing, and
(b) a ported check valve device disposed in said removable cover member past which, when unseated, compressed air may flow unrestrictedly in said one direction and via which, when seated, such reverse flow to atmosphere occurs at a predetermined restricted rate.

References Cited

UNITED STATES PATENTS

| | | | |
|---|---|---|---|
| 2,569,537 | 10/1951 | Robbins | 55—163 |
| 2,584,889 | 2/1952 | Latour | 55—33 |
| 3,080,693 | 3/1963 | Glass et al. | 55—33 |
| 3,080,977 | 3/1963 | Jones | 55—387 |
| 3,160,486 | 12/1964 | Busch | 55—162 |
| 3,182,435 | 5/1965 | Axt | 55—163 |

REUBEN FRIEDMAN, Primary Examiner

C. N. HART, Assistant Examiner

U.S. Cl. X.R.

55—387